3,422,722
COMBINATION SHEET METAL WASHER AND NUT
Wilbur Frank Ptak, Middleburg Heights, Ohio, assignor to Fastway Fasteners, Inc., Lorain, Ohio, a corporation of Ohio
Filed July 10, 1967, Ser. No. 652,311
U.S. Cl. 85—32                4 Claims
Int. Cl. F16b 37/02, 43/00

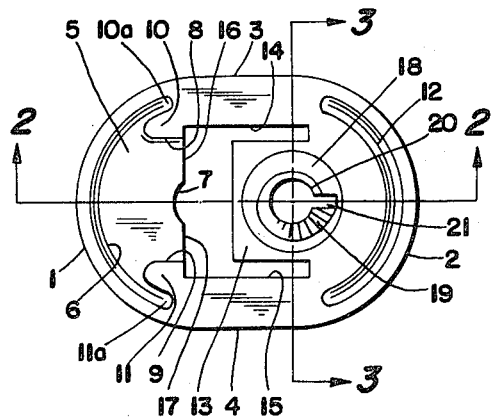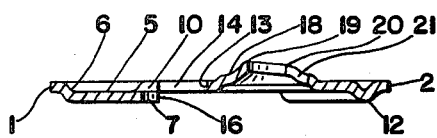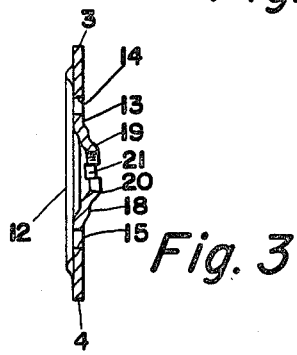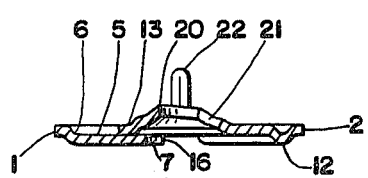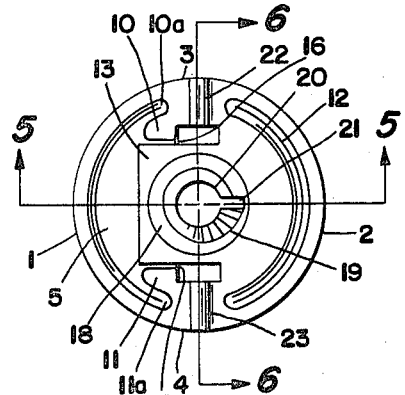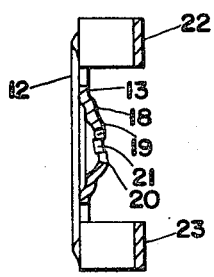
INVENTOR.
WILBUR F. PTAK
ATTORNEY

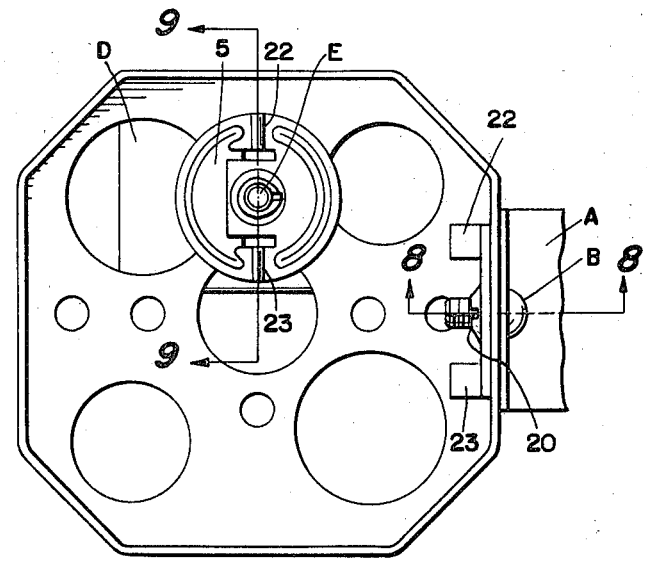
Fig. 7
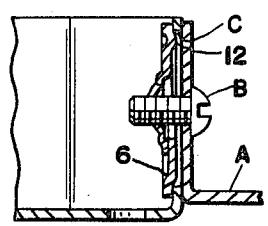
Fig. 8
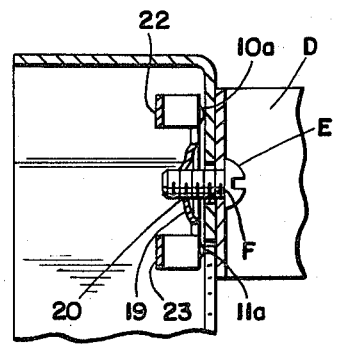
Fig. 9
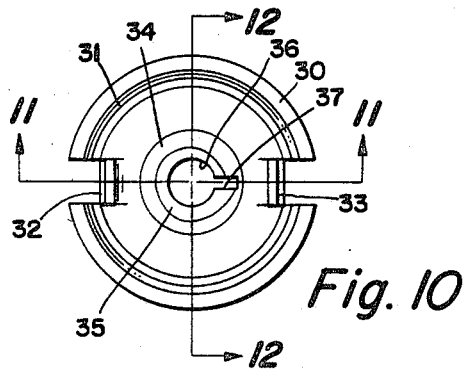
Fig. 10
Fig. 12
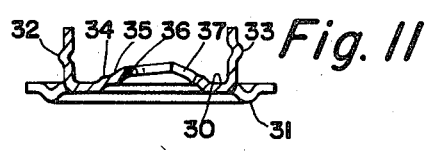
Fig. 11
INVENTOR.
WILBUR F. PTAK
BY
ATTORNEYS United States Patent Office 3,422,722
Patented Jan. 21, 1969

ABSTRACT OF THE DISCLOSURE

A combination washer and nut formed of sheet metal and having a circumferential bead which provides rigidity as well as a bearing surface against a flat surface, and is nestable within a knockout opening in a standard electrical outlet box; has a raised thread-receiving portion and means for supporting the same, and is provided with metal wings for tightening the nut, and which are spaced apart sufficiently to permit ample torque to be supplied to turn the nut by means of the fingers.

---

This invention relates generally to a combination washer and nut, but has reference more particularly to a device of this character which is formed from sheet metal and is especially adapted for use in association with standard electrical outlet boxes.

A primary object of the invention is to provide a combination washer and nut of the character described, having means which lends rigidity thereto, as well as serving other purposes.

Another object of the invention is to provide a combination washer and nut of the character described, having an embossed central portion or area adapted to receive and hold the threaded stem of a screw or the like.

A further object of the invention is to provide a combination washer and nut of the character described, having means formed integrally therewith for providing additional support for the aforesaid embossed central portion or area.

A still further object of the invention is to provide means formed integrally with the washer and nut for facilitating rotation of the same by means of the fingers and utilizing a substantial torque for such rotation.

Other objects and advantages of my invention will be apparent during the course of the following description.

In the accompanying drawings forming a part of this specification, and in which like numerals are employed to designate like parts throughout the same, FIG. 1 is a top plan view of the combined washer and nut in the stage of manufacture thereof prior to the finishing operation;

FIG. 2 is a longitudinal cross-sectional view, taken on the line 2—2 of FIG. 1;

FIG. 3 is a transverse cross-sectional view, taken on the line 3—3 of FIG. 1;

FIG. 4 is a view similar to FIG. 1, but showing the completed washer and nut;

FIG. 5 is a cross-sectional view, taken on the line 5—5 of FIG. 4;

FIG. 6 is a cross-sectional view, taken on the line 6—6 of FIG. 4;

FIG. 7 is an elevational view of a standard electrical outlet box, showing the manner in which the washer is used in connection with such boxes;

FIG. 8 is a fragmentary cross-sectional view, taken on the line 8—8 of FIG. 7;

FIG. 9 is a fragmentary cross-sectional view, taken on the line 9—9 of FIG. 7;

FIG. 10 is a view similar to FIG. 4, but of a modified form of the combined washer and nut;

FIG. 11 is a cross-sectional view, taken on the line 11—11 of FIG. 10, and

FIG. 12 is a cross-sectional view, taken on the line 12—12 of FIG. 10.

Referring more particularly to FIGS. 1, 2 and 3 of the drawings, the device, as shown in these views, is formed from sheet metal strip, by a series of operations, in which the device comprises a flat metal plate bounded by semi-circular ends 1 and 2, and parallel side edges 3 and 4 which interconnect these ends.

One end of the device is depressed slightly to provide a planar portion 5 of arcuate contour bounded by concentric edges 6 and 7, and edges 8 and 9, it being noted, however, that short portions 10 and 11 are left undepressed to provide short arcuate reinforcing beads 10a and 11a, and the edges 8 and 9.

The other end of the device is depressed to provide a semi-circular bead 12 of a depth substantially the same as the depth of the planar portion 5. This end of the device is provided with a tenon-like extension 13 which extends to substantially the mid-point of the device, so that a substantially U-shaped opening is left in the center of the device, which opening is bounded by edges 14 and 15 which are parallel with the edges 3 and 4, by the edges 16 and 17, by the edges of the extension 13, and by one end of each of the portions 10 and 11 and the edge 7.

The extension 13, as well as the portion of the device from which this extension extends, is embossed to provide a circular ledge 18 from which a hollow frusto-conical protuberance 19 extends, the upper edge 20 of which is in the form of a helix, with the high and lower portions of the helix being separated by a radially-extending slit 21. This protuberance is of a common type, and is described in Kost Patent 2,494,882, being adapted threadedly to receive a screw threaded shank after the manner of a conventional nut.

In the final stage of manufacture of the combined washer and nut, as illustrated in FIGS. 4, 5 and 6, the device, as shown in FIGS. 1, 2 and 3, is foreshortened and formed to provide a pair of upstanding wings 22 and 23, made by folding the portions of the device bounded by the edges 3, 4, 14 and 15.

At the same time, the extension 13 is caused to overlie and rest upon the planar portion 5 of the device, with the center of the protuberance 19 set in alignment with the wings 22 and 23.

As a result of this foreshortening of the device, the finished washer and nut is of generally circular contour, as shown in FIGS. 4, 5 and 6.

The combined washer and nut, as illustrated in FIGS. 4, 5 and 6, has several advantages.

The bead 12, beads 10a and 11a, and the depressed edge 6 serve to provide rigidity for the washer and nut, and the outer edges of these beads and edge are of a diameter adapted to fit or nest into a standard knockout hole in an eletcrical outlet box, to thereby prevent planar shifting of the washer and nut in relation to the hole.

The planar portion 5 of the device provides a rigid support for the extension 13 of the device, permitting the protuberance 19 from becoming distorted when engaged by the threaded stem of a screw incidental to a fastening operation.

The large bearing surface provided by the device is effective to prevent the device from becoming loosened.

The wings 22 and 23 facilitate rotation of the device by means of the fingers, and their spacing is such as to provide increased torque to facilitate such rotation.

In FIGS. 7, 8 and 9, several uses of the device in connecting parts to a standard electrical outlet box are illustrated.

One of these parts, designated by reference character A, is secured to the exterior of the box by means of a screw B, the threaded stem of which is connected to one of the devices of this invention which is nested in a knockout opening C. This illustrates the fact that the bead 12, beads 10a and 11a, and the depressed edge 6 are adapted to fit or nest into a standard knockout hole in the box, to thereby prevent planar shifting of the device relatively to such hole.

Another of these parts, designated by reference character D, is secured to one face of the box by means of a screw E, the threaded stem of which passes through a small hole F in the box and is connected to one of the devices of this invention which is disposed against the interior of this face of the box. This illustrates the fact that bead 12, beads 10a and 11a, and planar portion 5 of the device provide a large bearing surface which is effective to prevent the device from becoming loosened.

In FIGS. 10, 11 and 12, a simplified form of the combined washer and nut is illustrated, which is initially in the form of a flat circular disc 30 having a depressed circumferential bead 31.

The disc is slit along radial lines to provide portions which are bent upwardly to provide upstanding parallel wings 32 and 33, which function in the same manner as the wings 22 and 23 of the preferred form of the device.

The central portion of the device is embossed to provide a circular ledge 34 from which a hollow frusto-conical protuberance 35 extends, the upper edge 36 of which is in the form of a helix, with the high and lower portions of the helix being separated by a radially-extending slit 37. This protuberance is, in all respects, similar to the protuberance 19 of the preferred form of the device.

The bead 31 serves the same functions as the bead 12, beads 10a and 11a, and planar portion 5 of the preferred form of the device.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. A combined one-piece washer and nut formed of sheet metal, and being of generally circular contour, said washer and nut having depressed portions adjacent its outer circumference which are concentric with and axially-displaced from said circumference, said washer and nut having a central portion projecting from the side of said washer opposite to that of said depressed portions and having a central aperture formed with thread means adapted to be engaged by a threaded stem, and a pair of spaced upstanding wings constituting elements adapted to be manually engaged for the purpose of rotating the washer and nut.

2. A combined washer and nut, as defined in claim 1, in which said wings lie in a plane extending diametrically of said washer and nut and passing through the center of said central portion.

3. A combined washer and nut, as defined in claim 1, wherein said wings are disposed radially inwardly from said outer circumference and are disposed in spaced parallel planes.

4. A combined one-piece washer and nut formed of sheet metal, and being of generally circular contour, said washer and nut having depressed portions adjacent its outer circumference which are concentric with and axially-displaced from said circumference, a pair of spaced upstanding wings extending radially to said circumference to be engaged for the purpose of manually rotating the washer and nut, a cantilevered tenon-like extension extending across the center of said washer and nut and provided with an elevated hollow portion projecting from the side of said washer and nut opposite to that of said depressed portions and having a central aperture formed with thread means adapted to be engaged by a threaded stem, one of said depressed portions underlying the free end of said extension and constituting a support for the latter.

References Cited

UNITED STATES PATENTS

| 1,017,471 | 2/1912 | Ryden et al. | 85—36 |
| 2,382,942 | 8/1945 | Murphy | 151—41.75 |
| 2,397,238 | 3/1946 | Brose | 85—32 W |
| 2,969,705 | 1/1961 | Becker | 85—36 |
| 3,136,206 | 6/1964 | Adams | 85—50 |
| 3,358,729 | 12/1967 | Munse | 151—41.75 |

FOREIGN PATENTS 434,696  9/1935  Great Britain.

CARL W. TOMLIN, *Primary Examiner.*

RAMON S. BRITTS, *Assistant Examiner.*

U.S. Cl. X.R.

151—38; 85—36